H. D. BURGHARDT.
Railway Car Axle.
No. 93,671.
Patented Aug. 17, 1869.
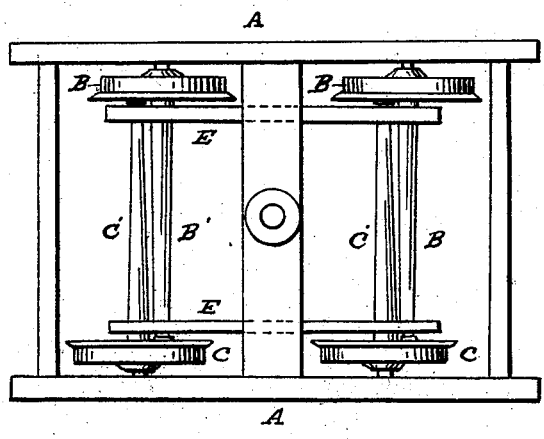
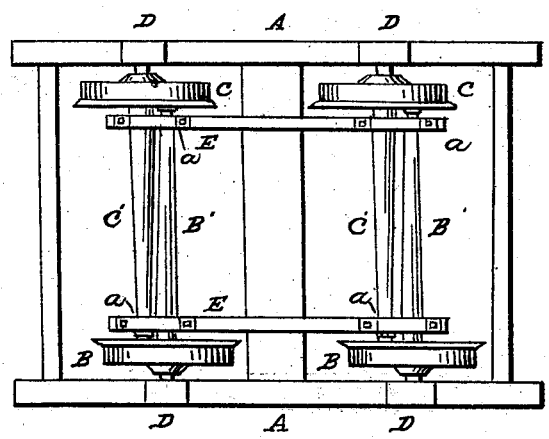
WITNESSES:
INVENTOR.

UNITED STATES PATENT OFFICE.

H. D. BURGHARDT, OF PITTSFIELD, MASSACHUSETTS, ASSIGNOR TO HIMSELF AND GEO. S. WILLIS, JR., OF SAME PLACE.

IMPROVED RAILWAY-CAR AXLE.

Specification forming part of Letters Patent No. 93,671, dated August 17, 1869.

*To all whom it may concern:*

Be it known that I, HEMAN D. BURGHARDT, of Pittsfield, in the county of Berkshire and State of Massachusetts, have invented a new and useful Improvement in Railway-Carriage Axles; and I do hereby declare the following, when taken in connection with the accompanying drawings and the letters of reference marked thereon, to be a full, clear, and exact description of the said invention, the said drawings constituting part of this specification.

Figure 1 of the drawings is a top view, and Fig. 2 an under side view, of the wheels and axles of a railway-car truck arranged in accordance with my improvement.

The employment of two independent axles with each pair of wheels has for its object the supporting of the wheels of railroad-cars or other vehicles, so that each wheel may revolve independently of the other, the outer end of the axle taking its bearing in the box in the usual manner, and the inner end being supported in a bearing independently of the other axle, the said bearing being supported by connection with the other axle and near the inside of its wheel. The axes of the two axles are parallel, and each axle is tapering from its wheel to its inner end or journal.

In order to the clear understanding of my invention, I will fully describe the same as illustrated in the accompanying drawings.

A is the frame of an ordinary car-truck; B B, the two wheels upon one side, and C C those upon the other side, of the truck, each pair B C being fixed to its respective axle B' and C'. The outer end journal of each of the said axles is supported in a box, D, in the usual manner. Near the inner sides of the wheels, and independent of the frame of the truck, I arrange two cross-pieces, E, which are connected with the boxes of the axles, near each of the wheels, by a suitable bearing or box, *a*, into which the wheel-axle, as well as the inner end of the axle of the opposite wheel, is entered, so that the axles of the two wheels on one side of the truck support the boxes of the inner ends of the axles of the opposite wheels. Coupled in this way, there is no strain upon the truck other than that of the bearing in the box, the coupling, by means of the cross-bar E, making the compound axle, or two axles, in effect a single axle; but each axle, while revolving independently with its own wheel, will be relieved from the strain consequent upon placing the two wheels upon the same axle. Thus I accomplish the object of independent axles, and produce a truck which may be driven on the shortest curves with no more friction than when run in a straight line, and with little or no liability of getting out of order.

My arrangement or improvement renders the axles and their boxes easy of access for being lubricated, or other purposes. In this arrangement the two axles have their axes parallel, the axles being tapered, so as not to interfere with one another.

I make no claim to the combination of two independent axles with a pair of wheels, nor the arrangement of the two axles so that one shall play within the other and be concentric with it; nor do I claim the arrangement of two such axles, so as to have their axes in one straight line with each other.

I would also remark that I am aware of the invention, as represented in the United States Patent No. 37,099, in which each axle has but two journals and boxes, which are situated at opposite sides of the truck-frame, with no intermediate support to the axle. This renders it necessary for each axle to project by the periphery of the wheel of the other axle of the pair. I am also aware of the invention described in the specification of the application of C. M. Landers and F. Harding for a patent, such application having been filed September 8, 1852, and rejected February 10, 1854. In this latter case each axle had but two bearings or boxes, the inner one of them being fixed to a cross-bar extended from one end bar to the other of the truck-frame, and fastened thereto. I make no claim to the two inventions last referred to, or any part or parts or arrangement of parts thereof. In my car-truck each axle is supported by three bearings—viz., by two duplex boxes, *a a*, and a bearing, D, and each of the boxes *a* is double, or has two bearings to receive the two shafts. Furthermore, the series of duplex boxes *a* are fixed to two bars, E E, arranged within the truck-frame, such bars being supported by the duplex boxes and the axles. Each duplex box serves as a safety apparatus, to sustain the axle in case of breakage of such axle between such box and the opposite one; besides, by being coupled to the two axles, the duplex box operates to strengthen the whole truck.

What, therefore, I claim as my invention is—

The arrangement and combination of the duplex boxes $a\ a$, the independent axles $B'\ C'$, their external boxes, D D, the support-bars E E, and the truck-frame A, the whole being substantially as specified.

HEMAN D. BURGHARDT.

Witnesses:
 THOS. P. PINGREE,
 JAMES M. BARKER.